J. D. KNAPP.
KNOCKDOWN SAW HOLDER.
APPLICATION FILED MAY 17, 1920.

1,371,692.  Patented Mar. 15, 1921.

INVENTOR,
J. D. Knapp
BY Adam E. Fisher
ATTORNEY

UNITED STATES PATENT OFFICE.

JAMES D. KNAPP, OF CONNEAUTVILLE, PENNSYLVANIA.

KNOCKDOWN SAW-HOLDER.

1,371,692.   Specification of Letters Patent.   Patented Mar. 15, 1921.

Application filed May 17, 1920. Serial No. 381,966.

*To all whom it may concern:*

Be it known that I, JAMES D. KNAPP, a citizen of the United States, residing in the city of Conneautville and State of Pennsylvania, have invented new and useful Improvements in Knockdown Saw-Holders, of which the following is a specification, reference being had to the accompanying drawings.

This invention relates to saw holding devices, for use in holding saws for filing.

The object is to provide a simple, efficient and durable saw holder of the knock down type, adapted to hold various kinds of saws for filing; and which may be quickly assembled or set up for use, or knocked down and compactly packed for carrying about or for shipment.

Figure 1:
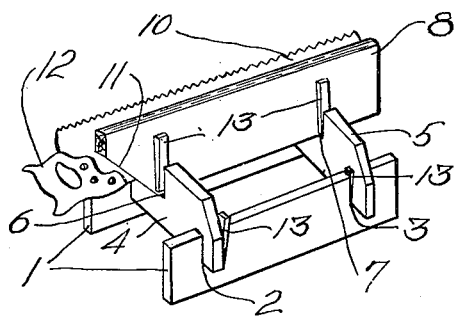
Figure 1 is a perspective view showing the holder set up and a saw positioned therein ready for filing.
Figure 2:
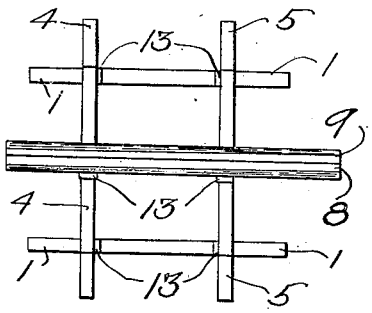
Fig. 2 is a plan view of the assembled device.
Figure 3:
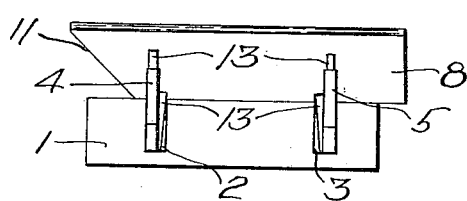
Fig. 3 is a side elevation.
Figure 4:
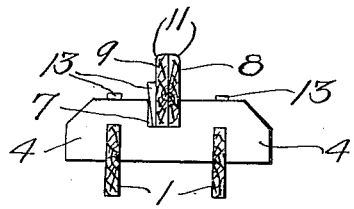
Fig. 4 is an end elevation.
Figure 5:
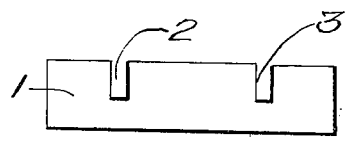
Fig. 5 is a detail of one of the foot bars.
Figure 6:
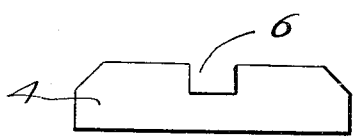
Fig. 6 is a detail of one of the cross-bars.
Figure 7:
Fig. 7 is a detail of one of the grip bars.
Figure 8:
Fig. 8 is a detail of one of the wedges.

In carrying out this invention I provide two duplicate foot-bars 1, as a support for the other elements; these foot-bars are each provided with two vertical, spaced, upwardly opening slots 2 and 3, one at each end, so that when the foot-bars are positioned apart, the slots 2 and 3 will stand in transverse alinement. The slots 2 and 3 are adapted to loosely receive transverse cross-bars 4 and 5; these cross-bars 4 and 5 are in turn each provided with a medial vertical, upwardly opening slot 6 and 7, wide enough to loosely receive the two grip-bars 8 and 9. These grip-bars 8 and 9 are positioned side by side, and thus adapted to receive and hold between them any saw blade as 10. The grip-bars 8 and 9 are beveled off at one end as shown at 11, so as to facilitate the mounting of certain classes of saws between the grip-bars for filing, it being contemplated that the beveled ends will accommodate for instance, the handle 12 of the saw, which is thus permitted to extend in under the upper edges of the grip-bars, so that the teeth of the saw are supported for approximately the entire length of the blade. The cross-bars and the grip-bars are all locked in set-up position with the saw blade between the grip-bars by means of a plurality of wedges 13 adapted, when forced into place at the sides of the respective bars and pressed against the sides of the slots, to hold the several elements all firmly in set-up and operative position.

In operation the saw blade is thus positioned between the grip-bars as shown and described, so that the teeth of the saw blade are exposed above the edges of the grip bars, in just the right position for filing. In use the foot-bar nearest to the operator may be permitted to drop down over the frontal edge of the work bench, thus inclining the apparatus toward the operator in handy position for use.

While I have herein described a certain specific method of constructing and assembling the elements of my invention, it is understood same may be varied in minor details, not departing from the spirit of my invention as defined in the appended claims.

What I claim to be new and patentable is:

1. A knock down saw holder, comprising two foot bars, each having two spaced, upwardly opening slots, same being alined transversely in pairs; two cross bars for positioning transversely and loosely through said slots of the foot bars, said cross bars each having a medial upwardly opening slot; two grip bars for positioning side by side longitudinally and loosely through the slots of the cross bars, and thus adapted to hold between them the saw blade for filing; and a plurality of wedges adapted for insertion between the sides of the cross bars and grip bars and the sides of the slots, for supporting the bars firmly in set up position, and for holding the saw blade firmly between the grip bars.

2. A knock down saw holder, comprising two foot bars, each having two spaced, upwardly opening slots, same being alined transversely in pairs; two cross bars for positioning transversely and loosely through said slots of the foot bars, said cross bars each having a medial upwardly opening slot; two grip bars for positioning side by side longitudinally and loosely through the slots of the cross bars, and thus adapted to hold between them the saw blade for filing; and means for supporting all of said bars firmly together in set up position.

JAMES D. KNAPP.

Witnesses:
W. E. KNAPP,
DELIA KNAPP.